(12) United States Patent
Ploix et al.

(10) Patent No.: US 9,213,325 B2
(45) Date of Patent: Dec. 15, 2015

(54) SYSTEM AND METHOD FOR MANAGING SERVICES IN A LIVING PLACE

(75) Inventors: Stéphane Ploix, Grenoble (FR); Duy Long Ha, Chambery (FR); Shadi Abras, Saint Martin d'Heres (FR); Mireille Jacomino, Echirolles (FR); Frédéric Wurtz, Crolles (FR); Seddik Bacha, Eybens (FR)

(73) Assignees: INSTITUT POLYTECHNIQUE DE GRENOBLE, Grenoble (FR); UNIVERSITE JOSEPH FOURIER - GRENOBLE 1, St. Marin d'Hères (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 397 days.

(21) Appl. No.: 13/641,672

(22) PCT Filed: Apr. 21, 2011

(86) PCT No.: PCT/EP2011/056419
§ 371 (c)(1),
(2), (4) Date: Oct. 16, 2012

(87) PCT Pub. No.: WO2011/131753
PCT Pub. Date: Oct. 27, 2011

(65) Prior Publication Data
US 2013/0041478 A1 Feb. 14, 2013

Related U.S. Application Data

(60) Provisional application No. 61/326,542, filed on Apr. 21, 2010.

(30) Foreign Application Priority Data

Apr. 21, 2010 (EP) ...................................... 10305421

(51) Int. Cl.
*G05B 15/02* (2006.01)
*G06Q 10/10* (2012.01)
(Continued)

(52) U.S. Cl.
CPC ................ *G05B 15/02* (2013.01); *G06Q 10/10* (2013.01); *G06Q 50/06* (2013.01); *H04L 12/2809* (2013.01); *H04L 12/2829* (2013.01); *H04L 12/6418* (2013.01); *H04L 2012/285* (2013.01)

(58) Field of Classification Search
USPC ............. 700/198, 285, 297, 7; 705/7.22, 305, 705/7.12; 340/351, 539
See application file for complete search history.

(56) References Cited

U.S. PATENT DOCUMENTS 6,842,776 B1 * 1/2005 Poisner .......................... 709/208
7,627,401 B2 * 12/2009 Benson et al. ................. 700/295
(Continued)

FOREIGN PATENT DOCUMENTS

GB            2448896 B      5/2009

OTHER PUBLICATIONS

Elmahalawy, Ahmed et al.: "Anticipation the Consumed Electrical Power in Smart Home Using Evolutionary Algorithms," Multimedia Computing and Information Technology (MCIT), XP031656144, Mar. 2, 2010, pp. 81-84.
(Continued)

*Primary Examiner* — Kidest Bahta

(57) ABSTRACT

A system is provided for managing services in a living place, including:
- a supervision system,
- an anticipative solving system,
- the anticipative solving system including a processing and memory system for: storing service type problem generators and powers and occupants' satisfaction-related transversal problem generator;
- collecting service type and related parameters for each service;
- generating instantiated constraint data for each service according to its type and an anticipative service type problem data based on the constraint data;
- generating global anticipative problem data;
- computing set-point data for each service based on the solved global anticipative problem;
- sending set-point data to the supervision system; and
- a reactive system adapted to adjust the set-point data computed by the anticipative system depending on the current state of each service.

9 Claims, 10 Drawing Sheets

(51) Int. Cl.
 *G06Q 50/06* (2012.01)
 *H04L 12/28* (2006.01)
 *H04L 12/64* (2006.01)

(56) References Cited

U.S. PATENT DOCUMENTS

| | | | |
|---|---|---|---|
| 8,040,234 B2* | 10/2011 | Ebrom et al. | 340/531 |
| 8,432,291 B2* | 4/2013 | Han et al. | 340/679 |
| 8,599,008 B2* | 12/2013 | Watson et al. | 340/539.1 |
| 8,599,021 B2* | 12/2013 | Belden et al. | 340/568.2 |
| 8,635,316 B2* | 1/2014 | Barnhill, Jr. | 709/223 |
| 2003/0046382 A1* | 3/2003 | Nick | 709/224 |
| 2003/0233201 A1* | 12/2003 | Horst et al. | 702/62 |
| 2006/0161394 A1* | 7/2006 | Dulberg et al. | 702/184 |
| 2006/0276938 A1 | 12/2006 | Miller | |
| 2007/0260359 A1* | 11/2007 | Benson et al. | 700/297 |
| 2010/0025483 A1 | 2/2010 | Hoeynck et al. | |

OTHER PUBLICATIONS

Abras, Shadi et al.: "A Multi-Agent Home Automation Approach for Power Management," Proceedings of the 1st IFAC Workshop on Convergence of Information Technologies and Control Methods with Power Plants and Power Systems, CLUJ-NAPOCA, Romania, XP009139313, Jul. 1, 2007, pp. 93-98.

Abras, Shadi et al.: "An Anticipation Mechanism for Power Management in a Smart Home Using Multi-Agent Systems," Information and Communication Technologies: From Theory to Applications, 2008, ICTTA, XP031258447, Apr. 7, 2008, 6 pages.

Ha, Duy et al.: "Realtimes Dynamic Optimization for Demand-Side Load Management," International Journal of Management Science and Engineering Management, vol. 3, No. 4, XP002604426, 2008, pp. 243-252.

* cited by examiner

SYSTEM AND METHOD FOR MANAGING SERVICES IN A LIVING PLACE

CROSS-REFERENCE TO RELATED APPLICATIONS

This application is a National Phase Entry of International Application No. PCT/EP2011/056419, filed on Apr. 21, 2011, which claims priority to European Patent Application Serial No. 10305421.9, filed on Apr. 21, 2010, and U.S. Ser. No. 61/326,542, filed on Apr. 21, 2010, all of which are incorporated by reference herein.

FIELD OF THE INVENTION

The present invention relates to a system and a method for managing services, in particular managing end-user appliances, power suppliers and storage systems, in a living place such as apartments, offices or any other places where people live.

BACKGROUND

A living place is both a place of power consumption and potentially a place of decentralized power production using resources like wind, solar, geothermal, etc. It contains a set of services, which can be decomposed into:
    the end-user services, providing satisfaction to occupants,
    the support services, gathering power supplier and power storage services, that provide power to end-user services.
Services are supported by appliances that may be controllable or not. Therefore, the design of an energy management system which allows the exploitation of different energy resources, while managing globally the energy needs and the production capacity of a living place, is an upcoming issue.

The role of a home automation system dedicated to energy management is to control the power provided by power suppliers in adapting the services according to occupant satisfaction criteria. It has to reach a compromise between the priorities of occupants in terms of satisfaction and cost while satisfying appliance behavioral constraints but also maximum available power and occupant satisfaction demand constraints.

Document GB 2 448 896 discloses an energy management system for management of the energy provided by different sources in a building. However, this system controls the energy sources only based on the optimization of the costs, and does not take into account the occupants' satisfaction in this optimization. Besides, the actuation of the energy sources is binary (starting or stopping an energy source), which offers a limited range of solutions. In addition, this system is not able to optimize the set-points of energy sources when a new controllable source is added in the building.

The design of a multi-level optimization algorithm to solve the global power management problem in a living place has been described by L. D. Ha, S. Ploix, E. Zamaï, and M. Jacomino in "Realtimes dynamic optimization for demand-side load management", International Journal of Management Science and Engineering Management, 3(4), November 2008. The main features of the global optimal home automation system are the following:
    Distributed: the appliances are independent and spatially distributed.
    Flexible: some appliances are controllable either because of physical flexibilities (e.g. for the storage systems, the triggering of new power suppliers or the natural inertia of some thermal systems), or because of service flexibilities related to occupant satisfaction functions that permits some variations for ending times or preferred temperature values for example.
    Open: the number of connected appliances may vary with time without having to completely redefine the control mechanism.
    Extendible: new kinds of appliances and services may appear.

The so-called reactive mechanism is a short time adjustment mechanism. This mechanism, which relies on a list algorithm, reacts quickly to avoid violations of energy constraints due to unpredicted perturbations and to guarantee a good level of occupant satisfaction. It can interrupt end-user services or trigger a new power resource such as a fuel generator.

Therefore, the reactive mechanism adjusts, with a short sample time, the set points that may come from a long-term plan computed by higher level algorithms, the device's current state (device satisfaction value), the constraints and occupant satisfaction criterion. The reactive mechanism only manages the so-called pre-emptive end-user services that can be modified for a while. A reactive mechanism has been described in detail in "A multi-agent home automation system for power management" by S. Abras, S. Ploix, S. Pesty and M. Jacomino, Proceedings of the Third International Conference in Control, Automation and Robotics, ICINCO 2006, pages 3-8. Although the reactive mechanism is sufficient to avoid constraint violations, the global optimal home automation system can be improved in order to avoid frequent adjustments.

This improvement is obtained thanks to the so-called "anticipation mechanism". The objective of this mechanism is to compute plans for production and consumption of services in the living place. The anticipation mechanism benefits from, on the one hand, some devices are capable of adjusting their set-point and of accumulating energy, and on the other hand, some services have a variable date for their execution: some services can be either delayed or advanced. The anticipation of the device consumption allows organizing it more efficiently.

The anticipation mechanism works on a time window, which corresponds to a sampling period called the anticipative period. This period is greater than the one used by the reactive mechanism (typically 10 to 60 times). Because of the large sampling period, it considers average values of energy, which is advantageous since it is difficult to make precise predictions. The predicted set points can be directly transmitted to devices or adjusted by the reactive mechanism in case of constraint violation.

From an anticipative point of view, the different services can be qualified as:
    controllable if they can be controlled by the anticipative mechanism
    predictable if their behaviour can be predicted.
Predictable and controllable services are managed by the anticipative mechanism. Predictable but non controllable services are globalized into one global non controllable service that impacts the global available energy. Non predictable and non controllable services are ignored by the anticipative mechanism. They will have to be taken into account by the reactive mechanism.

Each predictable and controllable service has to be modeled. For example, for a temporary end-user service, which corresponds to power profiles during a given period, the flexibility of the service comes from the possibility that it may be shifted. The internal knowledge of a temporary service can thus be modeled by:

a characteristic variable which corresponds to the ending time of the service;

a behavioral model that defines the possible power profiles once the service has been started;

a satisfaction function defined from the set of possible ending times to the set of resulting satisfaction values for occupants.

The parameters of the satisfaction function may be gathered into a set of characteristic points that represent respectively the earliest (unacceptable satisfaction), requested (fully satisfied) and latest starting times for the temporary service. For a permanent end-user service, which corresponds to a time unbounded power consumption, the flexibility of the service comes from the possibility of adjusting energy allocation from time to time. The internal knowledge of a permanent service can thus be modeled by:

a behavioral model linking the power profile to effect on the occupant's environment;

a satisfaction function defined from a set of adjustable variables (set-points) computed by the behavioral model to the set of possible satisfaction values.

The parameters of the satisfaction function may be gathered into a set of characteristic points. Even if a power profile covers several periods, there is only one value that models the occupant resulting satisfaction for the whole considered period: it is usually equal to the minimum of the satisfaction values computed for each time period. In addition, the supervision system may contain a learning mechanism which adjusts the parameters of the service behavioral models according to the actual services' states represented by collected measurements.

Moreover, a prediction system provides data useful for the computation of anticipative plans. These data may be: weather forecasts, upcoming energy costs and power limitations but also upcoming occupant service demands that may come from programming or an occupant request prediction system. A goal of the present invention is to provide a mechanism that allows the implementation of a global optimal management system to manage appliances in living places. Another goal of the invention is to provide a system whose architecture can be easily extended to new additional services.

SUMMARY

The invention thus provides a system for managing services in a living place, comprising:

a supervision system adapted to send set-point data to each service, an anticipative solving system adapted to optimize set-point data for each service, based on a cost and satisfaction criterion, communication means between said supervision system and each of said services, and between said supervision system and said anticipative solving system, said anticipative solving system comprising processing means and memory means for:

storing service type problem generators and powers and occupants' satisfaction-related transversal problem generator;

collecting service type and related parameters for each service;

generating instantiated constraint data for each service according to its type and an anticipative service type problem data based on said constraint data;

generating global anticipative problem data based on the service type problem data of each service and on problem data that are transversal to all services;

computing set-point data for each service based on the solved global anticipative problem;

sending set-point data to the supervision system, a reactive system adapted to adjust the set-point data computed by the anticipative system depending on the current state of each service.

According to a preferred embodiment of this system, processing means comprises a mixed integer linear programming (MILP) solver adapted to compute set-point data for each service based on said global anticipative problem data. The supervision system is advantageously adapted to send the computed set-point data to each service through said communication means, and each service is activated or deactivated based on the set-point data. In addition, the system preferably also comprises a prediction system and communication means between the supervision system and said prediction system, wherein the prediction system is adapted to send service request prediction data and/or energy cost prediction data and/or weather prediction data to the supervision system through said communication means. Besides, the anticipative solving system is adapted to collect service type and related parameters for a new service and to take said data into account in generating global anticipative problem data and computing set-point data for each service based on the solved global anticipative problem (so-called "plug-and-play" ability).

Another aspect of the invention is a method for managing services in a living place, comprising the steps of:

collecting at a supervision system service type and related parameters for each service;

collecting at the supervision system prediction data from a prediction system;

sending by the supervision system to an anticipative solving system a meta-description comprising the type, parameters and prediction data for each service and prediction data that are transversal to all services;

sending to a service type problem generator the parameters and prediction data for each service;

generating at the service type problem generator instantiated constraint data for each service according to its type and an anticipative service type problem data based on said constraint data;

sending the service constraint data to a transversal problem generator to finalize a global anticipative problem data;

solving the global anticipative problem based on a cost and satisfaction criterion;

extracting set-point data for each service from the solution of the global anticipative problem, wherein said set-point data define together an anticipative plan;

sending said anticipative plan to the supervision system;

sending the set-point data to the services by the supervision system;

collecting at the supervision system the current state of the services;

according to the current state of the services and to the set-point data, deciding at the supervision system to follow the anticipative plan or to adjust the set-point data until new predictions are received and/or the anticipative plan ends and/or the set-point data diverge from the anticipative plan;

according to the current state of a service, adjusting its parameters.

According to a preferred embodiment of the invention, the method further comprises a step of, when a new service is added, determining whether the related service type problem is known and, in the affirmative, causing said global anticipative problem data generation step to rely upon the constraint data of said new service. In this respect, the method further comprises a step of determining whether an anticipative service type problem generator related to said new service is present in said anticipative solving system and, in the negative, downloading the anticipative service type problem generator related to the new service from a remote site.

BRIEF DESCRIPTION OF THE DRAWINGS

Further features and advantages of the present invention will become apparent based on the following detailed description, with reference to the appended drawings in which.

BRIEF DESCRIPTION

Definitions

Figure 1:
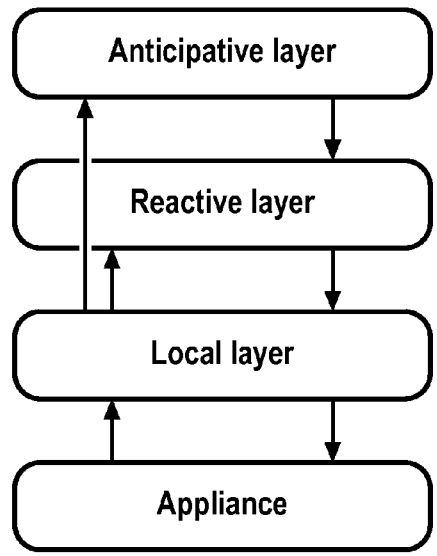
FIG. 1 is a schematic representation of the three-layer architecture of the building automation system.

A service is characterized by a satisfaction function to assess the occupant feeling of comfort. In the present text, a service is a set of appliances supplying a specific occupant need for end-user services that can be assessed, such as room heating service, cooking service or clothe washing service, and/or power for support services such as grid power supplier, photovoltaic power supplier, fuel power generator service or battery storage. For example, washing is a service whose satisfaction function is related to the ending time of the washing.

Heating, cooling and ventilation of a room are other services whose satisfaction function is related to the temperature in the room. However, these services may also be decomposed into several services depending on the chosen satisfaction function. In this respect, the appliances that support the services can be decomposed into:

end-user appliances, that directly provides satisfaction to occupants. For example, washing machine and HVAC systems are end-user services.

power suppliers, that provide final power to end-user appliances. Grid, photovoltaic plant, fuel engine are examples of power supplying appliances.

storage systems, that store and supply final power to end-user appliances.

A service is called "permanent" if its energetic consumption, production or storage covers the whole time range of energy assignment plan; otherwise, the service is called "temporary". A service is qualified as "end-user service" if it provides satisfaction to occupants. A service is qualified as "support service" if it provides power to end-user services. Support services gather power supplier and power storage services.

A service is qualified as "pre-emptive" if it can be managed by the reactive mechanism i.e. if it can be modified for a while: interruption or set-point adjustments can be considered. A service is qualified as "observable" if, at any time:

its power consumption or production is known for end-user services, the occupant satisfaction can be assessed (for instance, current temperature has to be measured to be able to assess occupant satisfaction in a thermal zone).

A service can be qualified as:

"controllable" if it can be controlled by the anticipative mechanism. It can be adjustable (set-points can be modified continuously) or shiftable.

"predictable" if its behaviour (in particular its power consumption or production) can be predicted.

A support service such as a power supplier is a source of energy whose energy cost can be assessed such as electricity (either provided by an external supplier or by, e.g., a photovoltaic system installed on the building), fuel, gas, etc. Predictable and controllable services are managed by the anticipative mechanism. Predictable but non-controllable services are taken into account by considering their foreseen production or consumption. Non predictable and non controllable services are globalized into one global non programmable scrap service, whose energy needs are foreseen globally.

The constraints of a service comprise the model of the appliances supporting this service and the expectations of the occupants modeled by a satisfaction function. For example, for the heating of a room, the constraint data comprise:

the temperature preferred by the occupants and the acceptable range for temperatures;

the features of the room (i.e. a model of the thermal dynamics of the room) including the HVAC system;

the predicted data related to outdoor environment, coming from weather forecast.

Another example is a washing machine. In this case, the constraint data comprise:

the expectations of the occupants (e.g. the ending time, with an acceptable ending time range);

the steps of the washing process (e.g. pre-washing, washing, etc.) and the power consumption associated with each step.

For a power supplier service, the constraint data are:

the type of energy;

the cost of energy and its variation in time.

An anticipative service type problem is a set of constraint data comprising continuous or discrete variables that express the requirements for each service, based on the constraints of said end-user service or support service. An anticipative problem is the problem that combines all the anticipative service type problems for each service of the living place. Its solution yields an anticipative plan containing set-point data for controllable services. Some variables and constraint data may remain inside service type problems that are specific to each type of service whereas some others have to be collected transversally, especially for the variables corresponding to energy, cost and satisfactions that intervene into the optimization criterion and into the global power constraints.

A solving system is a computerized system that is able to solve the anticipative problem, i.e. to find out the optimized set points for each service. The optimization is based on a cost/satisfaction criterion.

A type of service is a class of services that can be modeled by the same types of constraints but with different parameters. For instance, the following types are common:

grid power supplier, modeled by a supplied power limit and a cost function;

photovoltaic power supplier, modeled by a relation between solar radiation and electric power supplied and a cost function;

electric storage service, modeled by a state of charge and by equation characterizing charge and discharge dynamics;

water heating service, modeled by a stock of thermal energy and by equation characterizing charge and discharge dynamics depending of the provided hot water;

temporary end-user services, modeled by different consecutive states, characterized by their power consumptions and the occupant earliest acceptable ending time for the service and the occupant latest acceptable end time;

temperature controlling service, modeled by equations characterizing the thermal dynamics and the range of acceptable temperatures and the preferred one.

Description of the Home Automation System

The living place can be a family house, an apartment or an office, i.e. any kind of place in which people (referred to in the present text as "occupants") can be present any day or at determined times. The living place is supplied in power such as electricity, fuel, gas, etc. The power resources can be external to the living place, i.e. provided by an external supplier for a determined cost, or integrated to the living place, such as photovoltaic panels installed on a roof. The system may also comprise energy storage systems like battery of electric vehicles or static batteries. The cost of the power supplied by external suppliers can vary depending on the time, on the season, etc.

The building also comprises a plurality of services for the satisfaction of the occupants. The management system allows optimizing the cost and satisfaction criteria. For this optimization, cost and occupant satisfaction are weighted; the respective weights of cost and satisfaction are imposed to the anticipative solving system by the manager of the building.

An important issue in building automation problems is the uncertainties in the model data. For instance, solar radiation, outdoor temperature or services requested by occupants may not be predicted with accuracy. In order to solve this issue, a three-layer architecture, schematically illustrated by FIG. 1, is used that comprises a local layer, composed of embedded controllers already part of commercial appliances, a reactive layer and an anticipative layer.

The anticipative layer is in charge of scheduling services taking into account predicted events and costs in order to avoid as much as possible the use of the reactive layer. The prediction procedure forecasts various information about future occupants' requests but also about available power resources and the cost thereof. Therefore, it uses information from predictable services and manages controllable services.

This anticipative layer has slow dynamics and includes predictive models with learning mechanisms, including models dealing with occupant behavior. This layer also contains a predictive control mechanism that schedules energy consumption of end-user services or production of support services several hours in advance. This layer computes anticipative plans according to available predictions.

For typical anticipative problem, there are several thousands of constraint data, discrete and continuous variables. Mixed solving approach containing local or exploratory search algorithms such as Sequential Quadratic Programming or genetic algorithms are not powerful enough. Mixed Linear Integer Programming (MILP) solvers prove to be very efficient for such problems. Therefore, constraint data have to be expressed in a linear form.

From an anticipative point of view, the services can be related to a small set of service types: temporary end-user service, temperature controlled service (including room heating services, fridge and freezing services), water heating services, power storage, grid power supplier or photovoltaic power supplier. All these types of services can be expressed by linear models. The sampling period of the anticipative layer is typically equal to half-an-hour or an hour.

The reactive layer has to manage adjustments of energy assignment in order to follow up a plan computed by the anticipative layer in spite of unpredicted events and perturbations. Therefore, this layer manages pre-emptive services and uses information from observable services. This layer is responsible of decision-making in case of violation of predefined constraints dealing with energy and occupant satisfaction expectations; in other words, it performs arbitration between services or modifies the predicted use of controllable storage systems and power suppliers. This reactive layer follows the anticipative plan as close as possible while avoiding violating predefined constraints dealing with energy and occupant satisfaction expectations.

The set-points determined by the anticipative plan computed by the upper anticipative layer are dynamically adjusted in order to avoid occupant dissatisfaction. The control actions may be dichotomous in enabling/disabling services or more gradual in adjusting set-points such as reducing temperature set-point in room heating services or delaying a temporary service. The local layer is composed of appliances together with their existing local control systems generally embedded into appliance by manufacturers. It is in charge of adjusting device controls in order to reach given set points in spite of perturbations.

Figure 2:
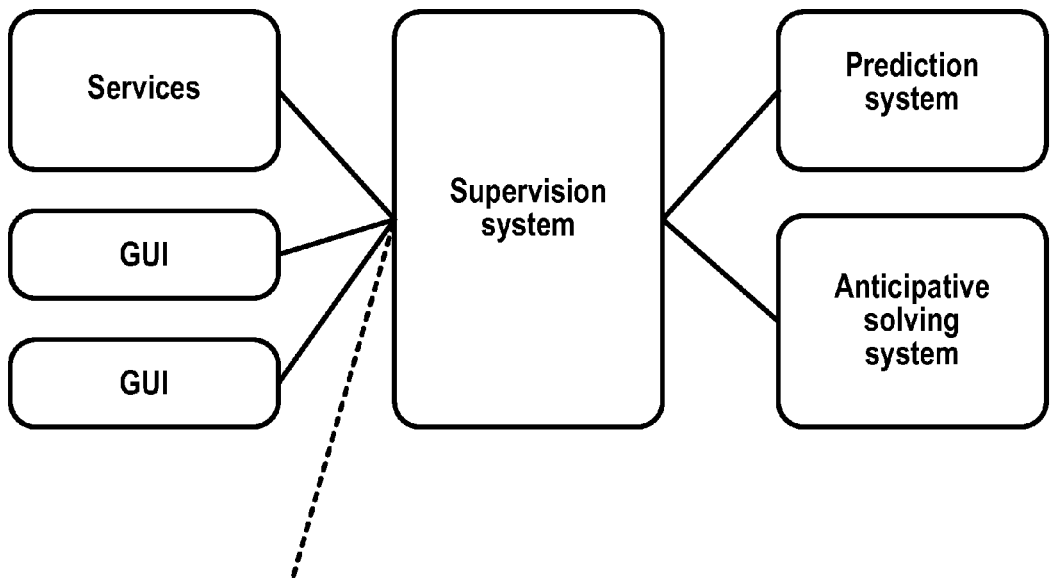
FIG. 2 shows the general architecture of the supervision system.

FIG. 2 depicts the overall architecture of the power management system. The system comprises the following hardware components. Service controllers comprise smart-plugs or embedded controllers. Smart-plugs are microcontrollers that are connected to one service and are interconnected between the electrical plug and the corresponding appliance (on the appliance side or in the electrical board).

Embedded controllers are microcontrollers with communication facilities that are embedded into appliances. Smart-plugs and embedded controllers have the following functions:

sending measurements to the supervision system when requested; said measurements contain the energy consumed since the last request from the supervision system, the current consumed power, the current activation state (if smart-plug is active, it is allowed to consume power, otherwise not), current set-point of the device if appropriate;

receiving orders such as getting measurements, activation/deactivation, new set-point for the service or setting starting time order;

optionally (essentially when plug-and-play properties are sought), sending configuration data such as the type of behavioral model and parameters.

The supervision system is the heart of the system. Indeed:

it keeps data available for GUI and can send historical data when requested;

it contains proxy for the different smart-plugs and/or embedded controllers;

it contains configuration data that characterize the occupant expectations via occupant satisfaction functions for each end-user service, and via cost functions for power suppliers;

it contains the reactive algorithm that dynamically unbalances services depending on occupant satisfaction and on the current context (power consumption and occupant satisfaction);

it can call the weather forecast software component to get the next predicted values for outdoor temperature and solar radiations;

it can call a occupant service request predictor to get the next predicted or scheduled occupant service requests.

it can also call the solver to compute upcoming set-points for the next 24 hours for instance.

Graphical User Interfaces (GUI) display the past values for variables such as power consumption, consumed energy, activation state, occupant satisfaction, temperature, stock in batteries, energy costs, etc. for each service. The prediction system provides prediction data not only for weather (weather forecast component) but also for occupant service requests (service request predictor) and energy costs (energy cost forecast component). It is used by the supervision system to build anticipative problems that are sent to the solving system. The anticipative solving system receives standard optimization problem for the computation of next set-point data, solves the problem and replies to the supervision system.

Two types of communication means are used:

sensor/actuator network between the service controllers and the supervision system. In buildings, the following protocols are usual: low consumption protocols (e.g. IEEE802.15.4, X10, Wavenis), dedicated protocols (e.g. KNX, LonWorks), industrial protocols (e.g. OPC);

xml over ip can be used for other types of communication (but technologies such as Java RMI, Corba, ActiveX can also be used as a complement): thanks to that choice, the different software components for supervision system, prediction system and solving system can be embedded into a box or distributed over a network.

Figure 3:
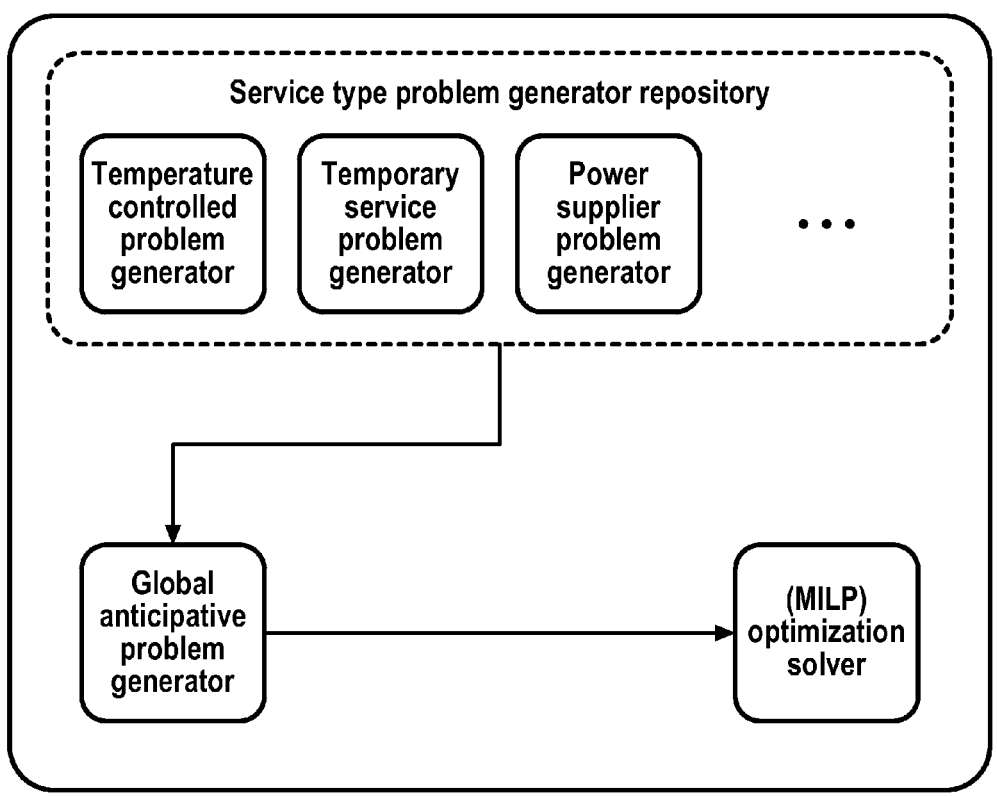
FIG. 3 is a schematic representation of the anticipative solving system.

FIG. 3 depicts the structure of the anticipative solving system. Firstly, a blank anticipative problem is created. It is then sent to anticipative service type problem generators for each service that are stored in the system with their specific parameters.

Once all the service type problems have added their constraint data to the global anticipative problem, the global anticipative problem generator adds the transversal constraints dealing with power equilibrium and cost and with global optimization criterion. The anticipative service type problem generators are part of a problem generator repository: they correspond to each type of service (e.g. temperature controlled service, temporary service, storage system, power suppliers, etc.). The transversal problem generator generates the transversal power constraints (there must be equilibrium between the produced power and the consumed one) and the global criterion balancing energy cost with global occupant satisfaction.

This architecture makes dynamical anticipative problem generation according to the services present in a system at any time, providing that their types belong to the problem generator repository and that each service can provide its specific parameters. When a new service is added, the corresponding anticipative service type problem generator is invoked from the anticipative problem generator repository in order to add constraint data and related variables. Some variables are collected by the transversal problem generator in order to finalize the problem in adding transversal constraint data and criterion that takes all the services into account, including the new one.

Description of the Optimization Process

The first phase of the process is the configuration of the system. The configuration can be done via a global set-up file or, if plug-and-play capabilities are expected, each service can provide its own parameters. Typically, the parameters of the system are the following:

a description of the database used by the archive system, the computation period for the anticipative mechanism (typically 1 hour or ½ hour), the number of periods for an anticipative problem (typically, 24), the computation period for the reactive mechanism (typically, a few seconds), the description of each service, i.e.:

name of the service and of the related services, location of the service controller, type of service (e.g. power supplier, heating service, temporary service, storage system or unsupervised service), a Boolean number, which is true if the service is pre-emptive, a Boolean number, which is true if the service is controllable, a Boolean number, which is true if the service is predictable, a typical maximum power consumption/production, a list of variables that are sent by the services to the supervision system, comprising the consumed/produced power and energy (negative if consumed and positive otherwise) since the last request by the supervision system, a list of parameters (which are sent to the related type of anticipative service type problem in order to instantiate the service type problem) that are dedicated to the corresponding service that make it possible to evaluate the occupant satisfaction for the end-user services at any time, or costs for support services, a list of parameters (which are sent to the related type of anticipative service type problem in order to instantiate the service type problem) that characterizes the behavioural models in both anticipative and reactive mechanisms, according to the related type of service, a default set-point for the service if it is an end-user permanent service, a balancing coefficient between costs and occupant satisfaction, for end-user services, a weighting coefficient modeling the relative importance of the service for the occupants.

The anticipative mechanism uses available predictions over a set of anticipative periods in order to compute the optimal set-points for the considered anticipative periods (typically 24×1 hour) and ending times for end-user services. Once these set-points have been computed, they are sent to the services. If necessary, the reactive mechanism performs arbitrations between services in order to take into account unforeseen consumptions and modifies the behaviour of controllable services, e.g. controllable power suppliers or storage systems.

Figure 4:
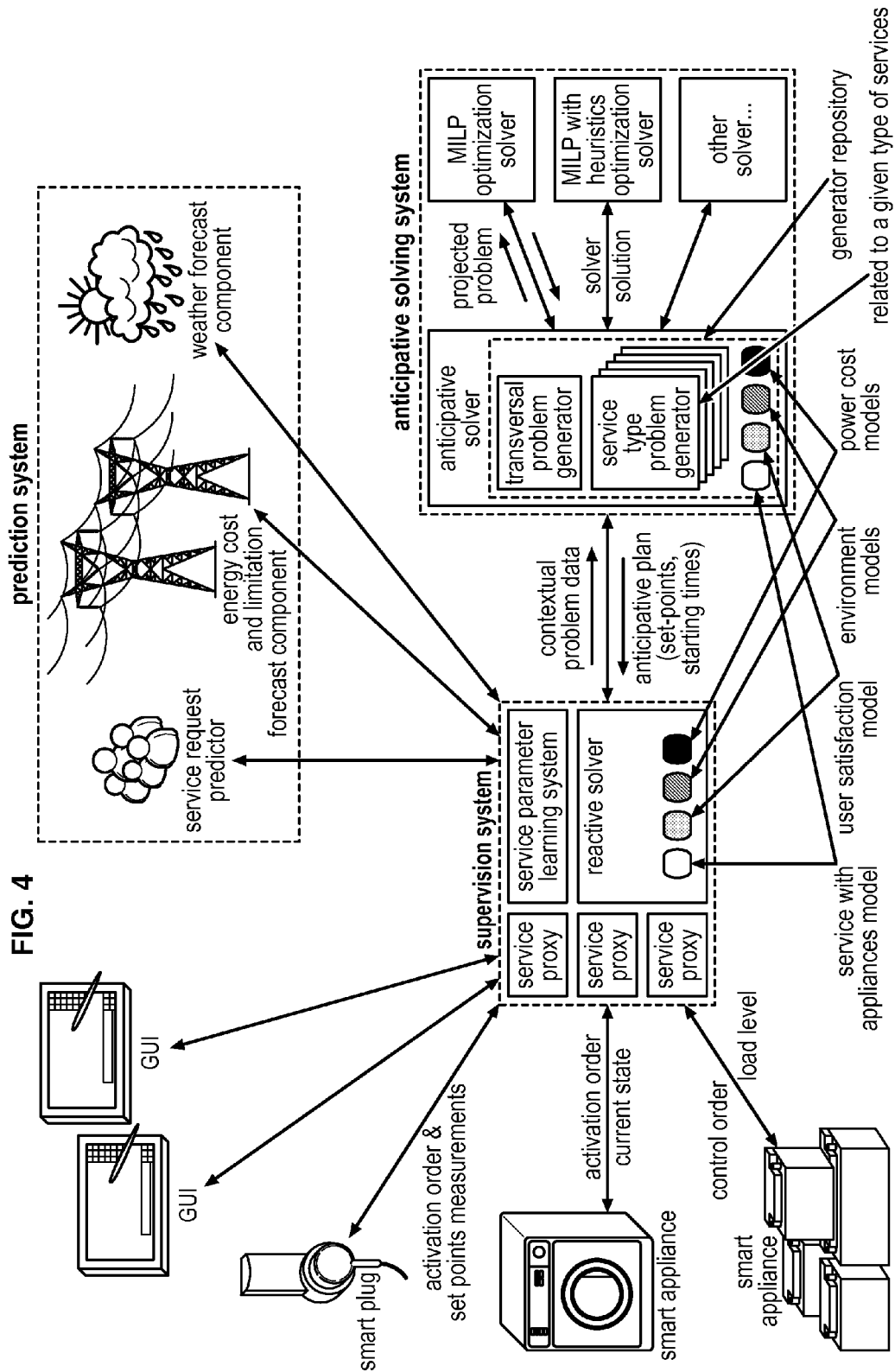
FIG. 4 is a schematic overall representation of the system according to the invention.

FIG. 4 depicts the overall structure of the system. Each time a prediction is updated, the following steps of the anticipative mechanism are carried out:

A1: From each service, the supervision system gets the parameters of its behavioural model. For each service, parameters of the occupant satisfaction function are collected: they may come from a predefined profile or from a setup step carried out by occupants.

A2: From each service, the supervision system gets the current state and the current measurements thanks to the variables provided by a corresponding service controller.

A3: The supervision system gets the service request predictions from the service request predictor. For instance, the service request predictor provides prediction data about the most probable times at which a temporary service will be used. For permanent services, it provides, for each anticipative period, the most probable needs of a service (for instance, the thermal zone occupation for heating services). The service request predictor can be based on Bayesian networks that learn its parameters and possibly its structure for the data provided by services.

A4: The supervision system gets weather prediction data from the weather forecast component that can connect to external websites to get predictions for the next anticipative periods. Such predictions may relate to outdoor temperature, solar radiation in different directions, wind, etc.

A5: The supervision system gets energy cost prediction data from the energy cost forecast component that can connect to a power provider website. It can also provide data on its own if the tariffs are static.

A6: The supervision system sends the anticipative problem to the anticipative solving system. The anticipative problem gathers all the services with their type and all the data previously collected, such as service parameters, current state of services, service request predictions, weather forecast, energy cost forecast, etc.

A7: The anticipative solving system analyzes the anticipative problem and uses relevant service type problem generators of the constraint generator repository to construct the anticipative problem to be solved.

A8: The anticipative solving system uses the transversal problem generator to finalize the optimization problem with transversal constraints such as power equilibrium, global cost and global occupant satisfaction.

A9: The anticipative solving system translates the general problem into a dedicated problem (complex problem) that is sent to an optimization solver (a mixed integer linear programming solver is most relevant given the complexity of the problem).

A10: The optimization solver computes the set-points for the services and resulting satisfactions for each service during each anticipative period. The set-point data for the next anticipative periods are sent by the supervision system via the service controllers to the permanent end-user services and to the storage systems and power suppliers. The set-point data sent to the temporary services are optimal starting times.

Once the set-point data have been computed for the next anticipative periods, they are applied, although not directly. Indeed, the set-point data are global values computed for anticipative periods and according to available predictions. However, predictions may not be exact and many service usages are not predicted.

Therefore, for each reactive period (typically, a few seconds), the reactive mechanism adjusts the set-points computed by the anticipative mechanism to the current context. To that end, the following process is carried out at each reactive period.

R1: From each service, the supervision system gets the current state and the current measurements thanks to the variable provided by the corresponding service controller.

R2: According to the current states of the services, the supervision system computes the current global consumption and compares it to the power production capacity.

R3: If there is enough power for all the services (i.e. the set-points defined in the anticipative plan can be applied without violating energy and satisfaction constraints), energy is allocated to all of them and the reactive process ends.

R4: The supervision system computes the current state of the pre-emptive services:

according to its current state, each pre-emptive service computes its current resulting occupant satisfaction and the one that will be reached at the next reactive period in case of activation and of deactivation of the service;

according to its current state, each pre-emptive power supplier computes its current cost and the one that will be reached at the next reactive period in case of activation and of deactivation of the appliance;

according to its current state, each pre-emptive storage system computes its current capacity and the one that will be reached at the next reactive period in case of activation and of deactivation of the appliance.

R5: The supervision system determines the pre-emptive services that are candidate for deactivation, in selecting the options that satisfy the energetic and occupant satisfaction constraints while remaining as close as possible to the set points coming from the anticipative plan.

R6: Activation and deactivation orders are sent to end-user pre-emptive services for the next reactive period.

R7: if the current state is too different from the expected one according to the anticipative plan, or if the anticipative plan comes to the end, or if prediction data are updated, the computation of a new anticipative plan is triggered.

Example of Implementation of the Invention

In the following example, the management system is controlled with an anticipative time period of 1 hour and a reactive time period of 60 seconds. The compromise between overall occupant satisfaction and cost is adjusted by a weighting parameter. The following parameters summarize what is known from the system itself either from auto-discovery mechanism or by setup data. The support services comprise a grid power supplier provider and a photovoltaic plant.

Grid Power Supplier

The grid power supplier is depicted by the following parameters.

A parameter is related to a subscribed power. For example: maximum subscribed power: 2,500 W.

Other parameters are related to invoicing, assuming German-type tariffs that encourage auto-consumption of photovoltaic production:

energy price for 1 kWh sold to the power provider: 0.43 Euros;

energy price for 1 kWh bought to the power provider: 0.19 Euros;

grant obtained for 1 kWh of photovoltaic power locally consumed: 0.25 Euros.

If these cost parameters are time-dependent, they rather belong to prediction data.

Photovoltaic Plant

The photovoltaic plant is depicted by the following parameter:

photovoltaic production ratio for 1 W of sun:3 W of electricity.

The end-user services comprise a living area with a heater and a washing-machine.

Heater

The heater is depicted by the following parameters.

Some parameters are general parameters that depict how the service (and therefore the corresponding appliance) can be handled:
preemptive?: yes
controllable?: yes
predictable?: yes Indeed, the heater is assumed to be pre-emptive and controllable.

Other parameters allow modeling the user satisfaction regarding the user service.

Figure 5:
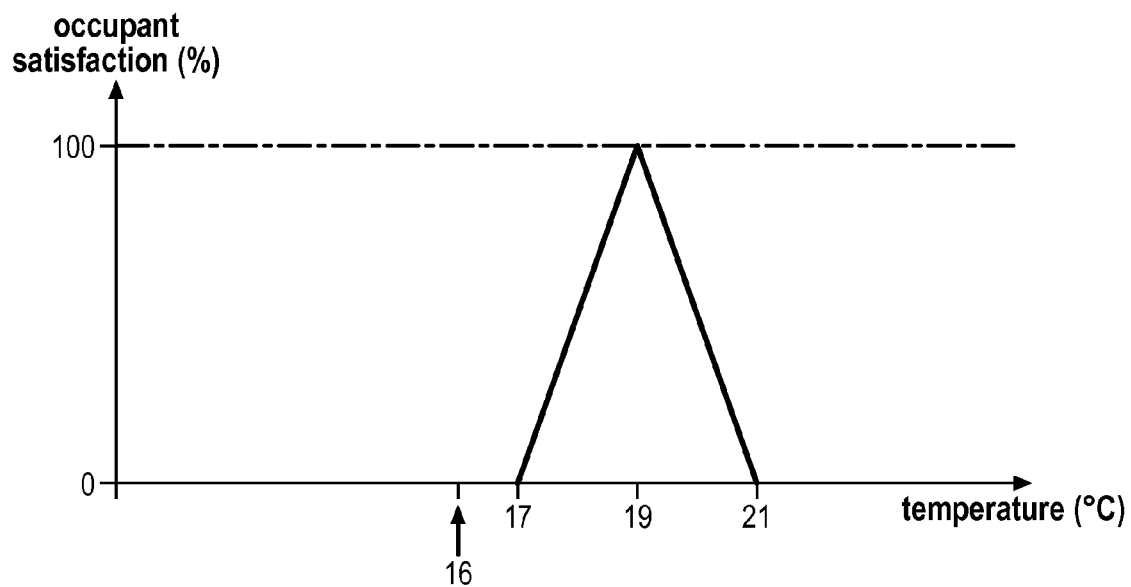
FIGS. 5 and 6 depict the occupants' satisfaction for a heater and a washing machine, respectively.

As illustrated on FIG. 5:
requested temperature: 19° C.,
acceptable upper temperature deviation: +2° C.,
acceptable upper temperature deviation: −2° C.,
minimum temperature when unoccupied: 16° C.

Another parameter is related to the electric heater:
maximum power of the heater: 1,000 W.

Other parameters are related to the living area itself:
time constant: 2 hrs 47 min;
controlled power gain (heater): 0.05° C./W;
undergoing power gain (heat from sun): 0.005° CNV.

Washing Machine

The washing machine is depicted by the following parameters.

General parameters depict how the service can be handled:
preemptive?: no
controllable?: yes
predictable?: yes.

Other parameters are modeling the appliance; for example:
average consumption: 2000 W.

Other parameters are modeling a sample of service request:
requested ending time: 7 pm;
washing duration: 2 hrs.

Other parameters are modeling the occupants' satisfaction:
acceptable advance for ending time: −7 hrs;
acceptable delay for ending time: +1 hr.

Figure 6:
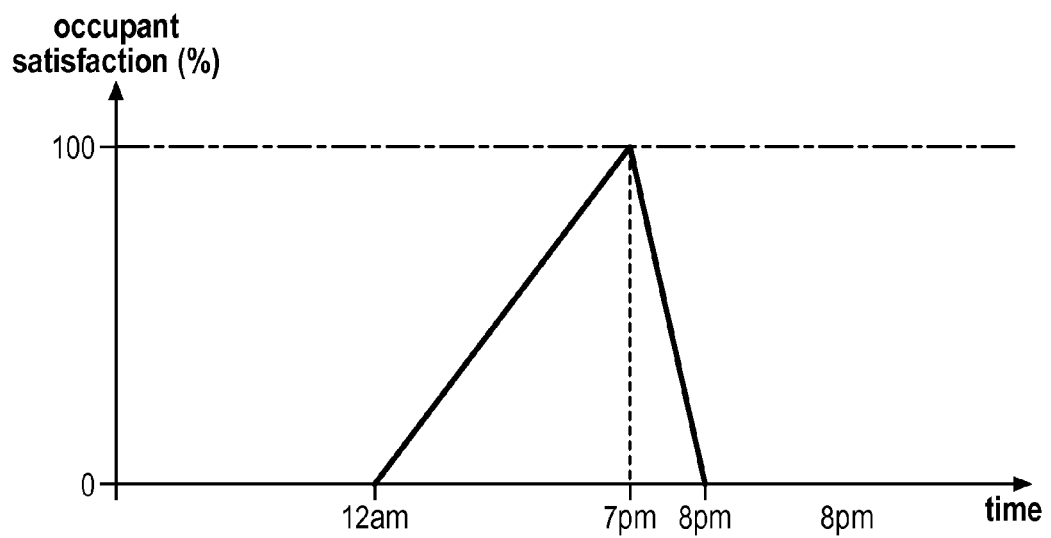

These parameters lead to the satisfaction function drawn on FIG. 6.

Scrap Service

The services also include a scrap service that gathers all appliances that are not controlled but known globally.

There is no specific parameter for this service.

As it appears clearly in the above description, the system provides a very simple way to define the constraint data of all the services. In particular, defining the different parameters does not require the intervention of a specialized person.

Figure 7:
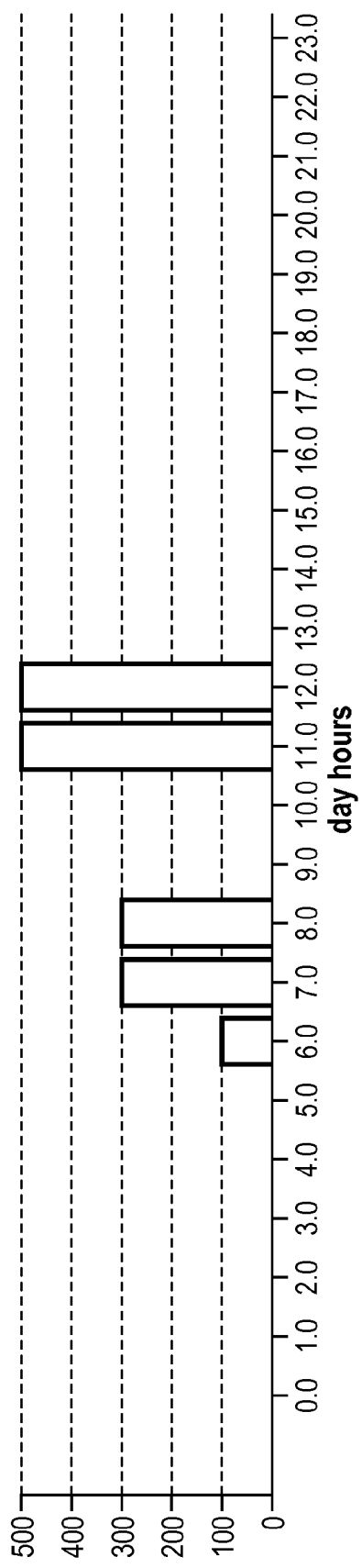
FIG. 7 illustrates the predicted power consumption of a scrap service.
Figure 8:
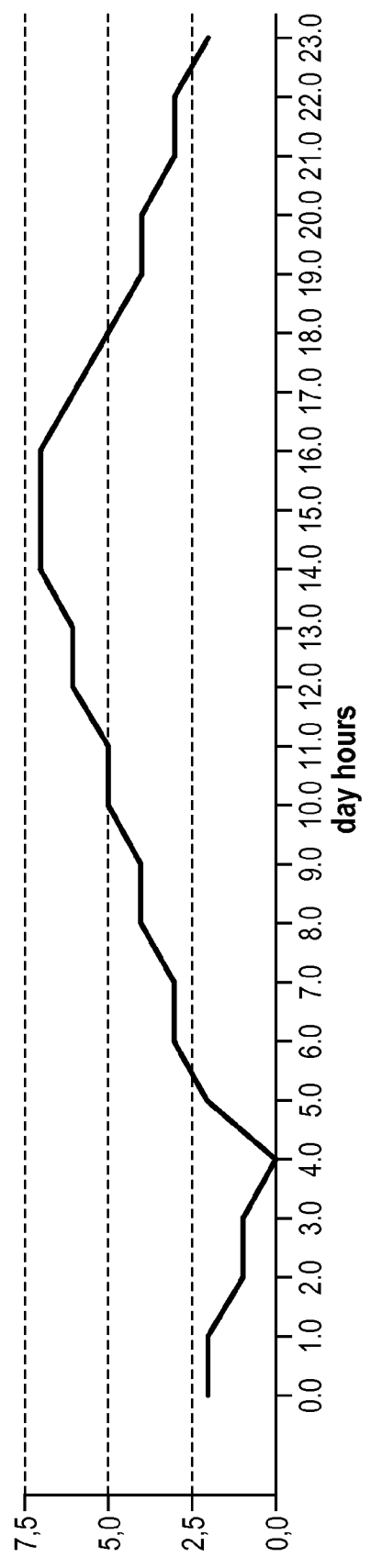
FIGS. 8 and 9 show the predicted outdoor temperature and solar radiation, respectively.
Figure 9:
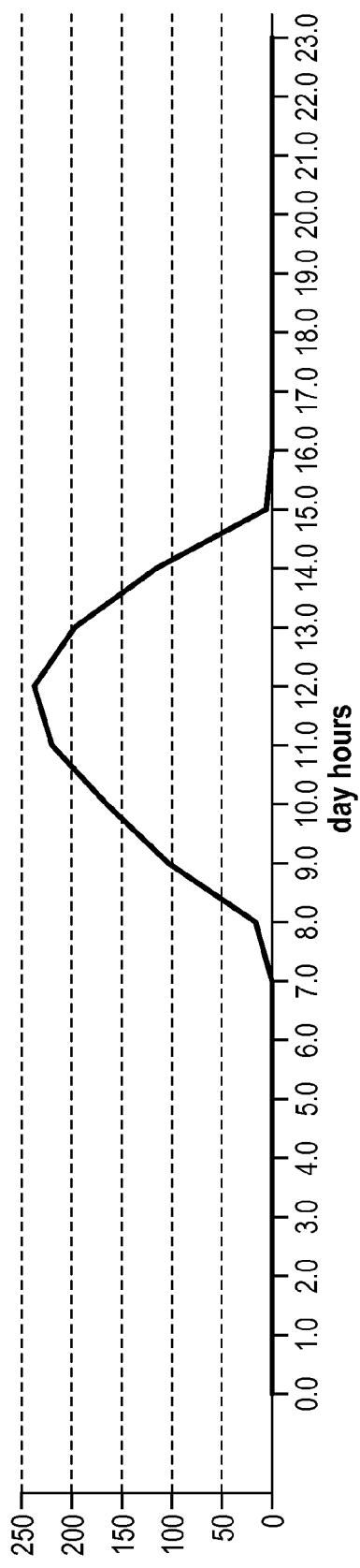

FIGS. 7 to 9 illustrate three examples of available prediction data. FIG. 7 shows the prediction for the consumption (in Watt) of the scrap service for the next 24 hrs. This prediction is typically obtained by computing a residual consumption corresponding to the difference between the global consumption in a representative past period of time (e.g. that of the week before) and the predicted consumption of all predictable services.

FIG. 8 shows the prediction of the outdoor air temperature (in ° C.) for the next 24 hrs. FIG. 9 shows the prediction of the solar radiation (in Watt) per square meter for the next 24 hrs. The predictions of FIGS. 8 and 9 are sent by a weather forecast component to the supervision system. An occupation in the living space is predicted from 7 pm to 9 pm.

The anticipative solving system thus generates a global anticipative problem based on the service type problem data of each service and on problem data that are common to all services. Preferably, a MILP problem is generated automatically using the setup data and the predictions. Set points for each service are then collected from the solutions found by the MILP solver used.

Figure 10:
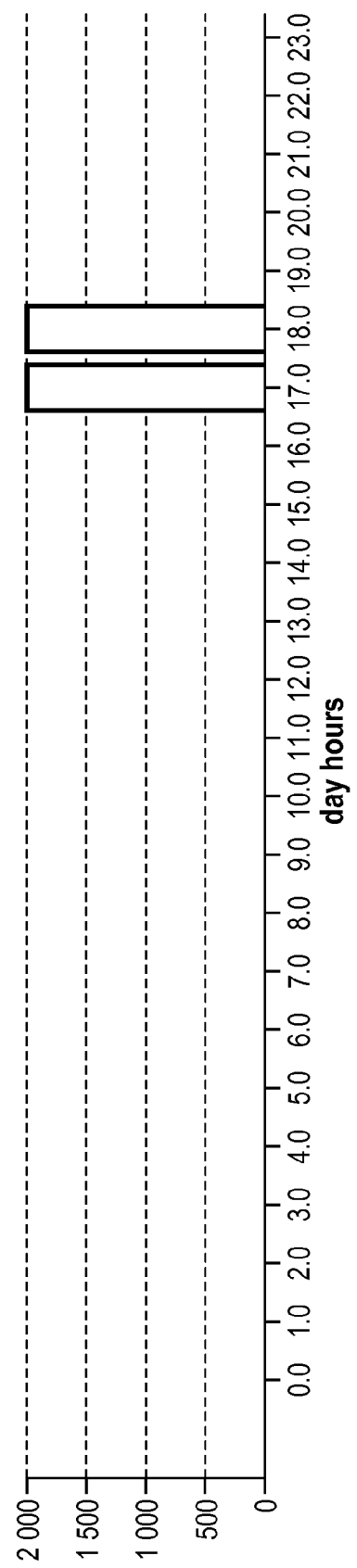
FIGS. 10 and 11 show the set points computed by the anticipative solving system for the washing machine and the heater, respectively.
Figure 11:
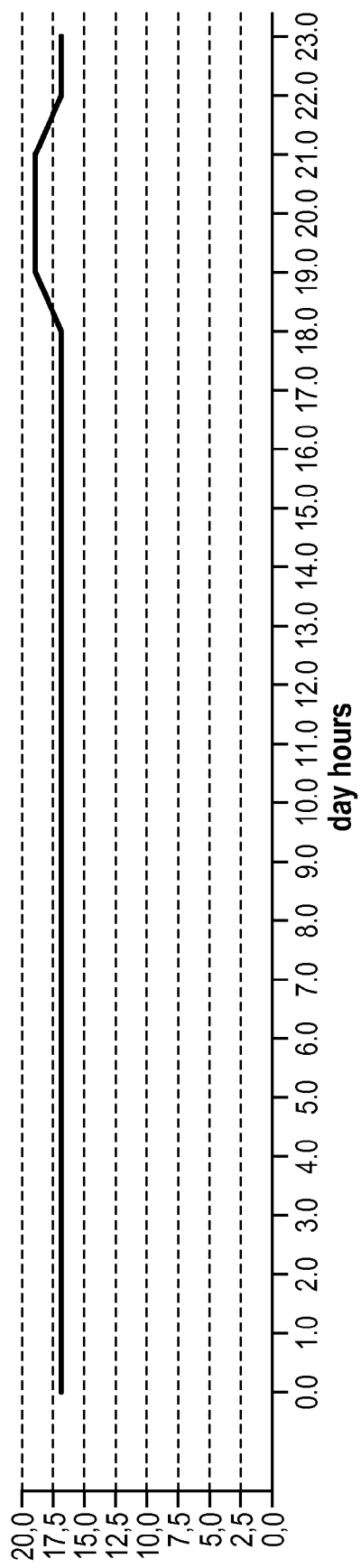

Based on the anticipative problem, the anticipative solving system then computes an anticipative plan that is illustrated on FIGS. 10 to 15. FIG. 10 shows the power consumption (in W·h) of the washing machine, whose ending time has been set to 6 pm. FIG. 11 shows the anticipative temperature set points for the living space (in ° C.).

Figure 12:
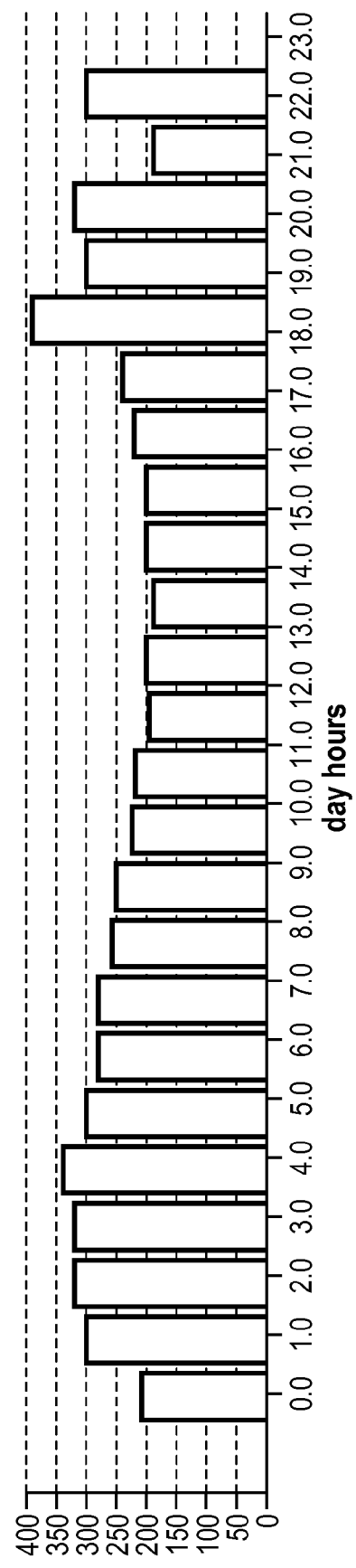
FIGS. 12 to 15 illustrate the anticipated energy consumption by the heater, the anticipated energy bought to a power supplier, the anticipated photovoltaic power production and the anticipated energy cost, respectively.
Figure 13:
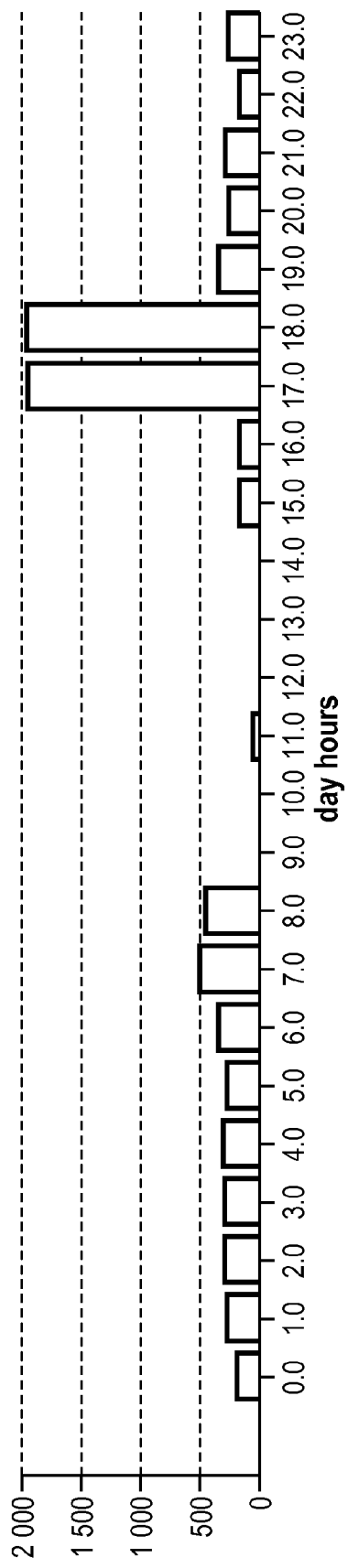
Figure 14:
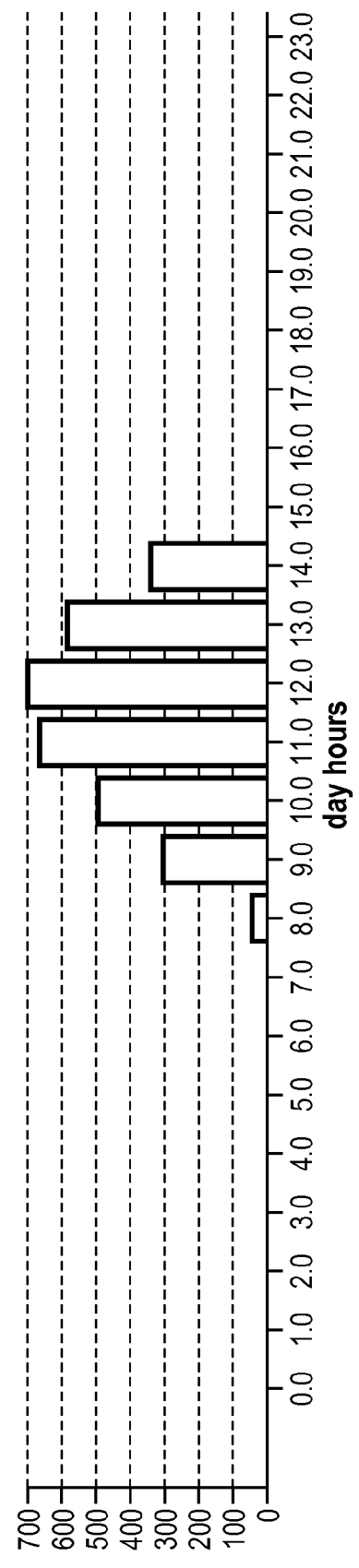
Figure 15:
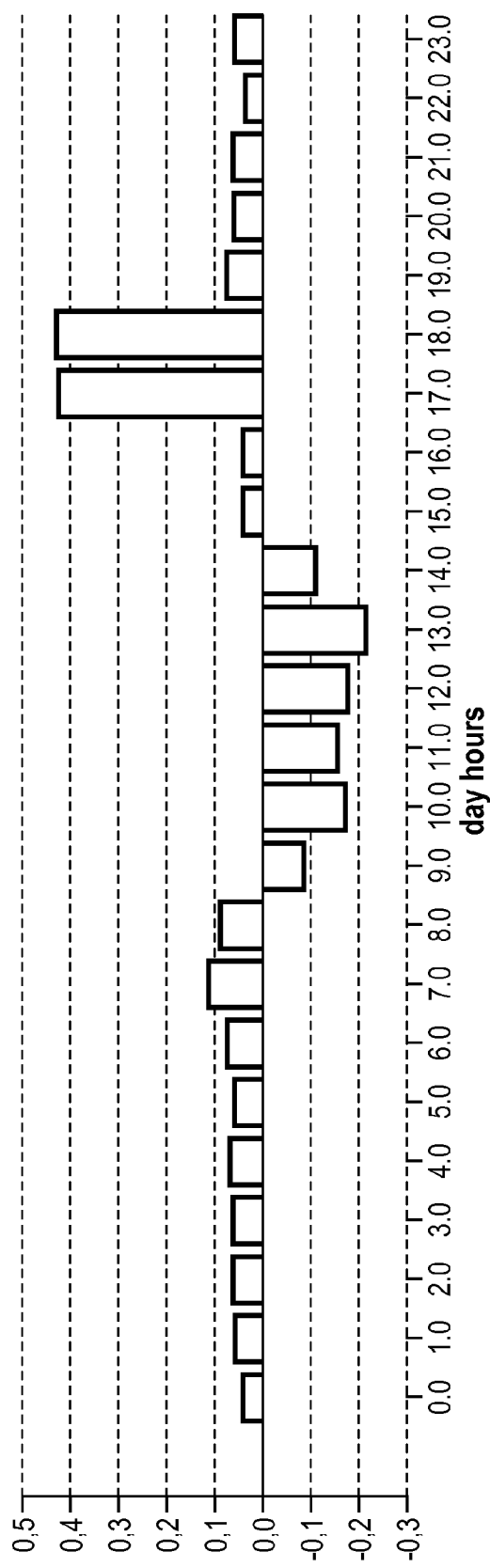

FIG. 12 illustrates the anticipated energy (in W·h) consumed by the heater in the living space. FIG. 13 shows the anticipated energy bought to the power supplier (in W·h). FIG. 14 shows the anticipated photovoltaic power production (in W·h). FIG. 15 shows the evolution of the anticipative energy cost along the day. It can be deduced from this graph that the global anticipative cost for the whole day is 0.90 Euro.

Figure 16:
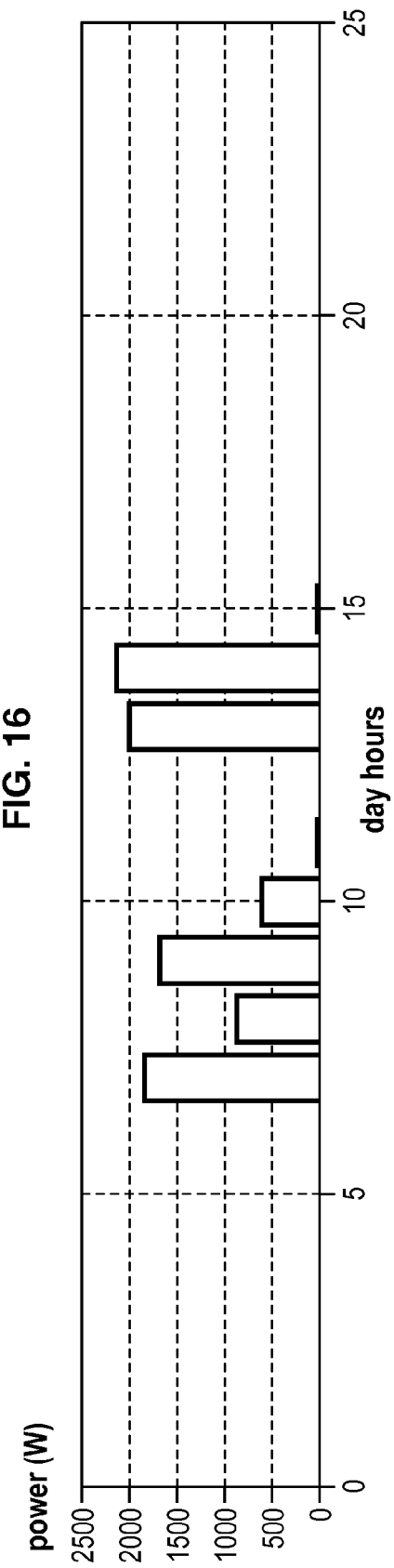
FIG. 16 illustrates the actual power consumption of the scrap service, which is different from the predicted one shown on FIG. 7.

To illustrate the role of the reactive system, it is now assumed that the actual energy consumption is that depicted on FIG. 16 instead of that of FIG. 7. Around 7 am, there is so much energy consumed by the scrap service that the predicted and available energy is not sufficient to supply all the services. The reactive system ensures that the energetic constraints are satisfied by modifying the computed anticipative plan thanks to unbalancing decisions at a 60 seconds sample period.

Figure 17:
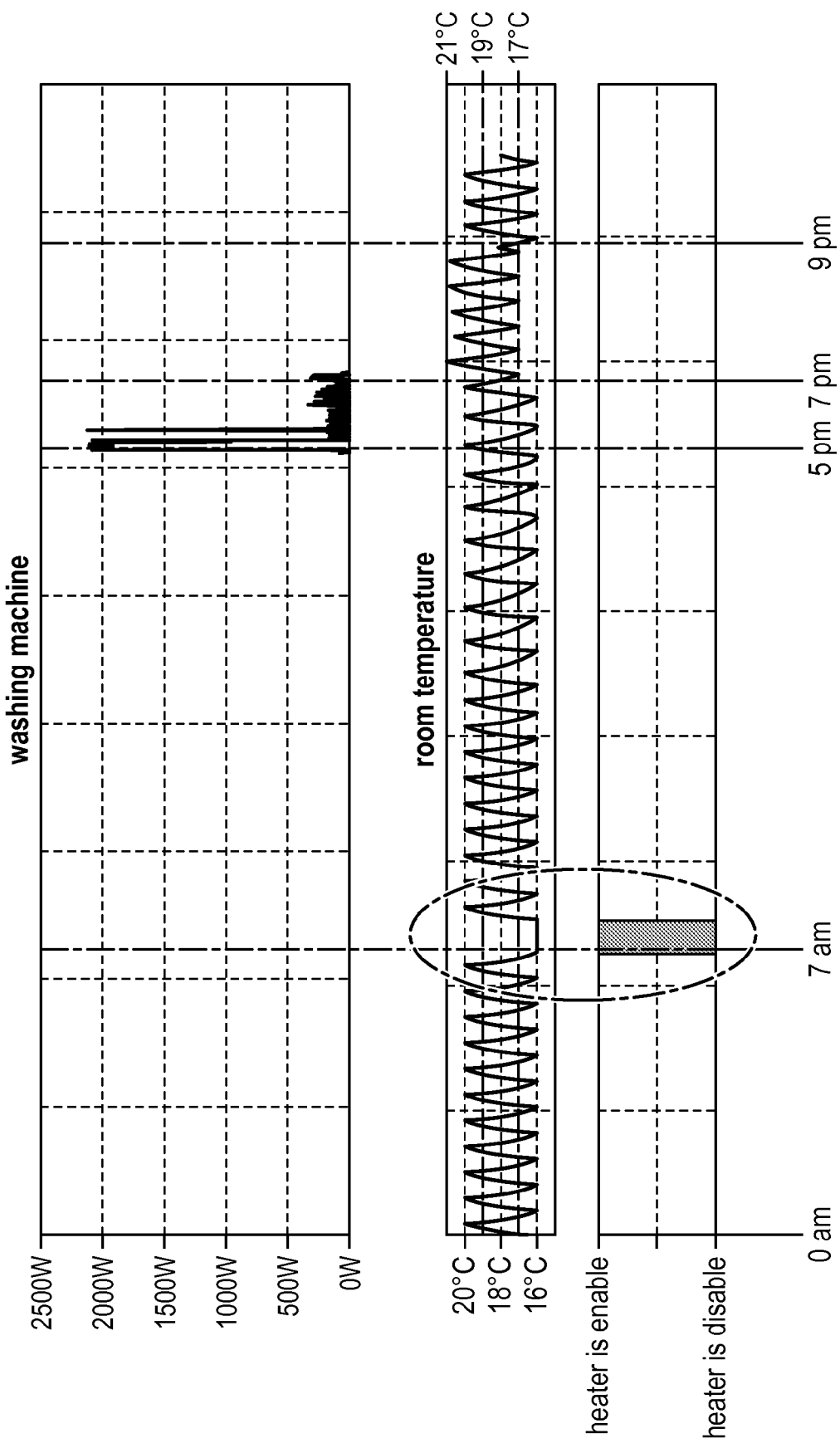
FIG. 17 illustrates the changes brought to the anticipative plan by the reactive system in order to take into account the actual power consumption of the scrap service.

Since only the heater can be unbalanced, it is alternatively enabled an disabled during the time period from 7 am to 8 am in order to reduce the power consumption while avoiding letting the temperature fall under 16° C. This is shown on FIG. 17.

Of course, the above embodiment is only one illustrative example and is not intended to limit the scope of the invention.

The invention claimed is:

1. A system for managing services in a living place, comprising:
    a supervision system adapted to send set-point data to each service;
    an anticipative solving system adapted to optimize set-point data for each service, based on a cost and occupant's satisfaction criterion, each of said cost and said occupant's satisfaction having an imposed respective weight;
    a first communicator between the supervision system and each of the services, and between the supervision system and the anticipative solving system;
    the anticipative solving system comprising a processor and memory operably:
        (a) storing service type problem generators and transversal problem generator, wherein a service type problem generator is adapted to generate a problem for a respective service and the transversal problem generator is adapted to generate transversal power constraints to the services and the cost and occupant's satisfaction criterion;
        (b) collecting service type and related parameters for each service;
        (c) generating instantiated constraint data for each service according to a respective service type and an anticipative service type problem data based on the constraint data, wherein a service type is a class of services that can be modelled by similar constraints but with different parameters;
        (d) generating global anticipative problem data based on the service type problem data of each service and on problem data that are transversal to all services;

(e) computing set-point data for each service based on the solved global anticipative problem;
(f) sending set-point data to the supervision system; and a reactive system adapted to adjust the set-point data computed by the anticipative system depending on the current state of each service.

2. The system of claim 1, wherein the processor comprises a mixed integer linear programming (MILP) solver adapted to compute set-point data for each service based on the global anticipative problem data.

3. The system of claim 1, wherein the supervision system is adapted to send the computed set-point data to each service through the communicator.

4. The system of claim 1, further comprising a prediction system and a second communicator between the supervision system and the prediction system, wherein the prediction system is adapted to send service request prediction data and/or energy cost prediction data and/or weather prediction data to the supervision system through the second communicator.

5. The system of claim 1, wherein the anticipative solving system is adapted to collect service type and related parameters for a new service and to take the data into account in generating global anticipative problem data and computing set-point data for each service based on the solved global anticipative problem.

6. A computer-implemented method for managing services in a living place, comprising:
   collecting, at a supervision system, service type and related parameters for each service;
   collecting at the supervision system prediction data from a prediction system;
   sending by the supervision system to an anticipative solving system a meta-description comprising the type, parameters and prediction data for each service and prediction data that are transversal to all services;
   sending to a service type problem generator the parameters and prediction data for each service;
   generating at the service type problem generator instantiated constraint data for each service according to a respective service type and anticipative service type problem data based on the constraint data;
   sending the service constraint data to a transversal problem generator to finalize a global anticipative problem data;
   solving the global anticipative problem based on a cost and satisfaction criterion;
   extracting set-point data for each service from the solution of the global anticipative problem, wherein the set-point data define collectively an anticipative plan;
   sending the anticipative plan to the supervision system;
   sending the set-point data to the services by the supervision system;
   collecting at the supervision system the current state of the services;
   according to the current state of the services and to the set-point data, deciding at the supervision system to follow the anticipative plan or to adjust the set-point data until new predictions are received and/or the anticipative plan ends and/or the set-point data diverge from the anticipative plan; and
   according to the current state of a service, adjusting its parameters.

7. The method of claim 6, further comprising, when a new service is added, determining whether the related service type problem is known and, in the affirmative, causing the global anticipative problem data generation step to rely upon the constraint data of the new service.

8. The method of claim 7, further comprising determining whether an anticipative service type problem generator related to the new service is present in said anticipative solving system and, in the negative, downloading the anticipative service type problem generator related to the new service from a remote site.

9. The system of claim 1, wherein the service type is selected from: a grid power supplier, a photovoltaic power supplier, an electric storage service, a water heating service, a temporary end-user service, and a temperature controlling service.

* * * * *